(12) United States Patent
Dullaway

(10) Patent No.: US 8,536,724 B2
(45) Date of Patent: Sep. 17, 2013

(54) OCEAN WAVE ENERGY CONVERTER

(75) Inventor: Glen Dullaway, Margate (AU)

(73) Assignee: Perpetuwave Power Pty Ltd, Queensland (AU)

( * ) Notice: Subject to any disclaimer, the term of this patent is extended or adjusted under 35 U.S.C. 154(b) by 354 days.

(21) Appl. No.: 12/992,022

(22) PCT Filed: May 15, 2009

(86) PCT No.: PCT/AU2009/000611
§ 371 (c)(1),
(2), (4) Date: Nov. 10, 2010

(87) PCT Pub. No.: WO2009/137884
PCT Pub. Date: Nov. 19, 2009

(65) Prior Publication Data
US 2011/0068579 A1     Mar. 24, 2011

(30) Foreign Application Priority Data

May 15, 2008   (AU) .............................. 2008902409

(51) Int. Cl.
F03B 13/10   (2006.01)
F03B 13/12   (2006.01)
H02P 9/04    (2006.01)

(52) U.S. Cl.
USPC ........................................................ 290/53

(58) Field of Classification Search
USPC ......................................... 290/42, 43, 53, 54
See application file for complete search history.

(56) References Cited

U.S. PATENT DOCUMENTS

| | | | |
|---|---|---|---|
| 594,078 A | 11/1897 | Haag et al. | |
| 616,467 A | 12/1898 | Jones | |
| 643,557 A | 2/1900 | Swearingen | |
| 1,667,152 A | 4/1928 | Hegge | |
| 1,925,742 A * | 9/1933 | Bamber et al. | 60/505 |
| 3,957,398 A * | 5/1976 | Lloyd | 417/331 |
| 4,462,762 A | 7/1984 | Palani | |
| 4,560,884 A | 12/1985 | Whittecar | |
| 7,298,054 B2 | 11/2007 | Hirsch | |
| 2008/0018114 A1 * | 1/2008 | Weldon | 290/53 |
| 2012/0267949 A1 * | 10/2012 | Sharon et al. | 307/9.1 |

OTHER PUBLICATIONS

PCT International Search Report for PCT/AU2009/000611 dated Jul. 13, 2009.

* cited by examiner

*Primary Examiner* — Javaid Nasri
(74) *Attorney, Agent, or Firm* — Abelman, Frayne & Schwab

(57) ABSTRACT

An ocean wave energy converter comprising a structure that is supported above the water and that has means to stabilize the structure, an array of guided independently operated elongate floats that operate from the structure above via two or more guidance arms, wherein each guidance arm is attached to the structure so that the floats pivot about the horizontal axis parallel the length of the floats, each float is attached to the guidance arms at the center of buoyancy of the float, and the floats are substantially parallel to the wave fronts.

18 Claims, 2 Drawing Sheets

OCEAN WAVE ENERGY CONVERTER

CROSS REFERENCE TO RELATED APPLICATIONS

This application claims priority to PCT application No. PCT/AU2009/000611, filed May 15, 2009, which claims priority to Australian patent application No. 2008902409, filed May 15, 2008, both of which are incorporated herein by reference.

TECHNICAL FIELD

This invention relates to an improved ocean wave energy converter. This invention has particular application to an improved ocean wave energy converter which uses oscillating or reciprocating motion of a number of independently operated elongate floats to produce electrical or other forms of useful energy. Other forms of useful energy include, for example, hydraulic energy for powering desalination plant, pumping plant or such like. The floats are guided by two or more guidance arms for each float.

BACKGROUND ART

Designing a successful ocean wave converter or power plant is complex, and for over a hundred years, a large number of different designs have been trialled but still none are in commercial production and none have proved beyond doubt via the public release of actual performance levels (which is the standard in the established wind turbine and solar industries) that the design can make commercial levels of power output let alone at an acceptable cost. The reality is there is a limited amount of energy in the oceans waves with average wave height of about 1 meter prevalent in most oceans of the world, and the energy is very difficult to extract being a pulsing type energy available about every ten seconds being an average wave period, and some 50+ meters between consecutive waves. This makes it extremely difficult to produce commercial levels of consistent electricity and for a design to be successful in this environment requires a very specific design that is tailored to the energy source.

The prior art shows many different ocean wave energy converter designs have used floats or buoy type designs to extract the energy from the waves, and these are either independently operated or non independently operated and are either round or cylindrical designs or those that are elongate or rectangular. The present invention relates to those ocean wave energy converters that use an array of elongate floats that are independently operated.

U.S. Pat. No. 1,925,742 discloses a single trailing arm which has a float thereto affixed and as such the design is very low in power production and has a very small buoyancy volume to move up a wave. U.S. Pat. No. 3,957,398 discloses lots of two telescopic arms, each lots of two arms being fixed to an elongate cylindrical float. The arms are operated independently of each other. The small buoyancy volume offered by the cylindrical floats and the large distance between the floats is inefficient at extracting energy from the waves and again results in low performance per square meter of the energy converter. U.S. Pat. No. 4,560,884 discloses two trailing arms pivotally attached to each elongate, independently operated float but the floats are too small and are spaced too far apart for the wave energy converter to make sufficient power for each square meter of energy converter, and thus again the design has a low power output and is not economical. It is suggested that the above prior art does not individually or in combination provide the right mix of features required to produce a high energy density or acceptable cost ocean wave power energy converter.

DISCLOSURE OF THE INVENTION

The present invention aims to provide an improved ocean wave converter that provides superior performance through the optimal shape, sizing, spacing, design and operation of an array of independently operated and guided elongated floats that results in an efficient, robust, high power density and cost effective power plant to be produced. Other aims and advantages of the invention may become apparent from the following description.

This invention resides broadly in an ocean wave energy conversion apparatus including:

a structure for positioning in a body of water, the structure being arranged so that at least a portion of the structure is above the body of water in use;

a plurality of elongate floats having an average width and being spaced apart to provide a gap therebetween in a first direction, the first direction being substantially parallel to the direction of wave travel, the elongate floats extending in a second direction substantially perpendicular to the first direction, the gap between the elongate floats at rest being less than double the average width of the floats;

a plurality of arm pairs, each arm pair including a pair of arms pivotally mounted to the structure at a respective arm pivot axis and to a respective float at a float pivot axis to thereby allow relative movement between the float and the structure, the arms having a spacing in the second direction, and wherein the spacing for each arm pair is different so that the arms of one arm pair cannot contact the arms of another arm pair in use;

an energy converter for converting motion of the floats into electrical or other useful energy; and a drive connecting at least one of the arms of each elongate float to the energy converter and arranged such that at least upward motion thereof drives the energy converter The invention also aims to provide an ocean wave energy converter where an array of two or more closely spaced elongate floats are pivotally attached to two guidance arms operating from the structure above, the guidance arms being so disposed that, as the floats move up, they also move backwards to a smaller extent in the direction of wave travel which has the effect of increasing the energy that can be converted by the float and guidance arm system, especially the energy in a breaking wave. This also reduces the mechanical loadings on the floats and associated mechanisms and structures. The energy of the moving water in a breaking wave can also be harnessed to assist in moving the float up and backwards to extract more energy. In the preferred design the above said guidance arms are trailing arms and preferably by means disclosed herein allow for the said floats to be positioned closely together and operate in extreme conditions without interfering with adjacent floats and the most preferred design also allows for any float to be raised for maintenance without inhibiting the operation of any other float.

The elongate floats are shaped and sized so that maximum energy extraction from a normal wave can occur, and in the preferred design the front of the floats is angled back at the bottom or is rounded at the lower front corner to work better in severe conditions and assist in extracting energy from the breaking component of the waves' energy. In its broadest scope there are not means provided to freely allow for the float to move on an angle if required, but in the preferred design there is means provided to freely allow the for the floats to operate well on an angle if waves are approaching from either side of parallel to the long side of the elongated floats, or if the waves cause the floats to rise higher on one end than the other end.

The present invention includes a structure that is supported above the water and is stabilised by means to at least substantially reduce rocking of the structure as an array or plurality of two or more floats extract energy from the waves. The floats are independently operated elongate floats that are guided from the structure above by two or more guidance arms each to extract energy from the waves at least on the upward stroke. The guidance arms may be of the reciprocating telescopic type design that leans backwards less than 40° or they may be of the trailing arm type of design that pivots from the structure. Preferably, each guidance arm is pivotally attached to the structure substantially horizontally and to the elongate floats equidistantly from the structure so that the floats pivot about a substantially horizontal axis, called for convenience, the float pivot axis. The float pivot axis is substantially parallel to the elongate sides of the floats. The guidance arms are attached to the floats at or about the average centre of buoyancy with reference to the width of the float (±15% of the width of the float from the centre of buoyancy). The floats are at least substantially parallel to the wave fronts when at rest, meaning the structure may or may not have yaw with the floats being parallel to the mean wave direction if the structure does not yaw, the guidance arms cooperate with the structure and provide for the floats to move up and down in a repetitive motion as the waves pass and to transfer energy from the floats to the drive means being any form of hydraulic fluid or gas or direct drive means that results in a recovery of useful energy.

The floats are substantially four sided, rectangular or elliptical or any combination thereof in cross section with the combined weight of the guidance arms and float at rest being between 5% and 50% of the buoyancy offered by the float. The average height of a float is between 10% and 80% of the average width of the float and the length of a float is more than 250% of the average width of the float. The average gap between the elongate sides of the floats at rest is less than 200% of the average width of the floats, and in the most preferred form the gap is between 15% and 70% of the average width of the float.

In the preferred design, at least in larger wave height conditions, the float is caused to become at least partially submerged into a wave front before or as the float moves up over the wave, and then the float at least substantially retains its extent of submergence for at least a substantial part of its upward stroke. The combined weight of the guidance arms on the floats and floats at rest is between 10% and 35% of the buoyancy offered by the float and the length of the elongated floats is more than 300% of the average width of the floats and less than 2000% of the average width of the floats, the average height of the floats is between 20% and 50% of the average width of the floats, the front side of at least some of the floats is shaped like the front lower half of an eclipse, or angled back from the top so the average angle of the rounded or angled portion of the said front side from horizontal is between 20° and 70° from the front upper corner looking back and with the most preferred design the angle is between 35° and 55°. In the preferred design the guidance arm to float pivot allows for limited sideways outward movement of the swing arm relative to the float of up to 20% of the width of a float from its state of rest position so the float can operate well on an angle to the wave, or if the wave is lower at one end to the other end.

In the preferred design, the extent to which the float becomes submerged into the wave and as the float moves up over the wave is at least greater when the average wave height is between 2 and 3 meters than when the average wave height is about a half meter, and in the most preferred design the float is submerged into the wave by more than 30% more when the average significant wave height (Hsig) is between 2 and 3 meters than when the average Hsig is between 0.5 and 0.7 meters. Further preferences have the guidance arm being a trailing arm and the trailing arms and float do not interfere with adjacent floats or adjacent trailing arms while operating, the width of the float being sized relative to the length of the trailing arms and the trailing arms being attached between about the average centre of buoyancy of the float and 15% of the width of the float behind the average centre of buoyancy.

In the most preferred design, means are so disposed so that any one of the trailing arms may be raised while the wave energy converter is in operation without reducing the stroke angle of the adjacent swing arms, and in the preferred design the said means to allow the swing arm to be lifted without interference of any other float or trailing arm is by having the trailing arms of each later float going back, being offset to the outside of the previous trailing arms and the trailing arm float pivot is located off the end of the float and may be located above or below the top of the float It is also preferred that each subsequent float going back is longer than the previous float by about the distance needed to clear the previous trailing arm, so that the distance from the said float to the trailing arm float pivot is maintained. It is further preferred that the structure is supported above the water by pontoons or hulls and these may be partly filled or emptied with water by pump means to adjust the height of the energy converter or to compensate for high side winds.

BRIEF DESCRIPTION OF THE DRAWINGS

In order that the invention may be more readily understood and put into practical effect, reference will now be made to the accompanying drawings which illustrate one or more preferred embodiments of the invention, and wherein.

BEST MODE FOR CARRYING OUT THE INVENTION

Figure 1:
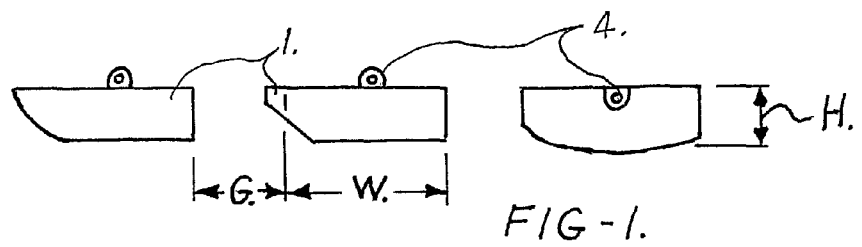
FIG. 1. is a end view of an array of floats according to the present invention.
Figure 2:
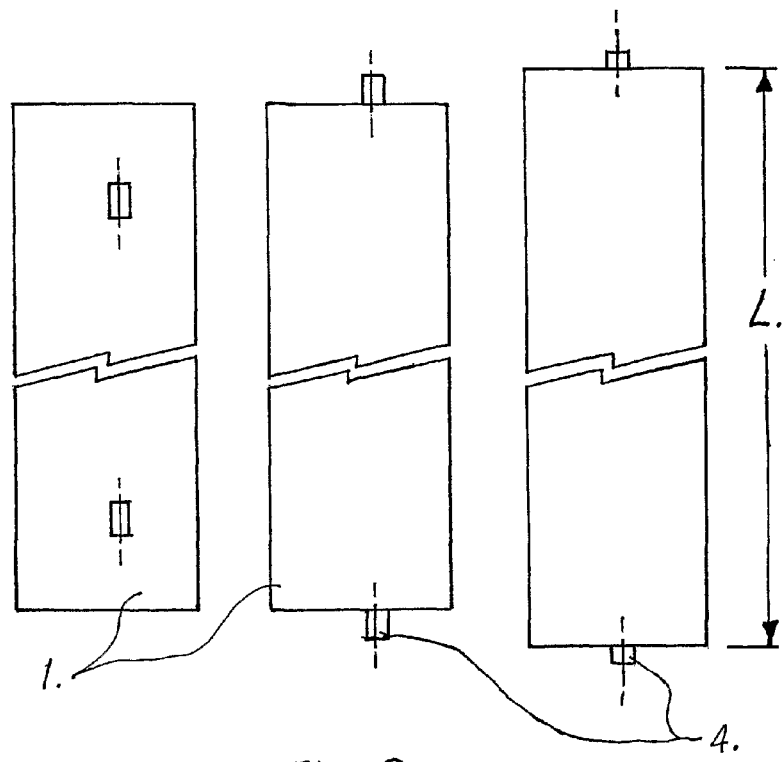
FIG. 2. is a top view of the array of floats as shown in FIG. 1.

The improved ocean wave energy converter illustrated in FIGS. 1 and 2 includes an array of floats 1 that illustrate some of the possible combinations of shape of the float and guidance arm float bracket 4. The length (L) of the floats is about 600% of the width (W) of the float. The float on the left in FIGS. 1 and 2 is the forward float of the array and has a rectangular back section and an elliptical front lower section with the guidance arm float brackets located in from the end of the float as shown. The float has a rectangular rear section and an angled front section for eighty percent of the height of the front side as shown on an angle of 50° from the top. On the float on the left and the float in the middle of FIGS. 1 and 2, the guidance arm float bracket 4 is wider than the width of the guidance arm so the guidance arm may slide sideways relative to the float. In the float on the right hand side of FIGS. 1 and 2, the float has a rectangular section on the top and the underside is convex being the bottom half of an eclipse, and the guidance arm float bracket 4 being located below the top of the float, and the respective guidance arm float brackets 4 being shorter than on the other two floats and only located pivotal movement of the floats is provided. adjacent floats have a gap (g) between the elongated sides of the floats of between 40% and 50% of the float width (W), as the floats are spaced at essentially the same distance apart but the difference in (G) comes about due to (W) being taken as the average width of the float 1. For the same reason the height of the floats is between thirty percent and forty percent of the width of the floats. Also the float guidance arm 2 location relative to the width of the floats 1 is between the centre of buoyancy and ten percent of the float width behind the centre of buoyancy.

Figure 3:
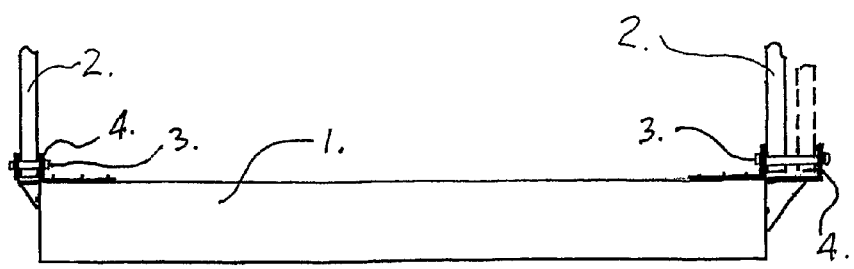
FIG. 3. is a front view of a float and attached guidance arms and showing the guidance arm float pivot.

The float shown in FIG. 3 has guidance arms 2 extending from the pivot point with the float to guide the float. The pivot point comprises a float guidance pin 3 that is secured at both ends by the guidance arm float bracket 4 which is firmly fixed to the float, and the respective guidance arm which pivots about the float guidance pin. On the left hand side of the float, a located pivot design is used while on the right hand end the float guidance pin can be seen to be extended and this allows the guidance arm to slide along the shaft for a short distance. On the right hand end of the float the hole in the end of the guidance arm that goes around the float guidance pin is five percent larger than the diameter of the float guidance pin to allow for the float to have limited movement to slide back and forth along the guidance arm as it moves to change its angle on a wave. The broken lines show the extent of possible movement of the guidance arm about the float when a float is caused to operate on an angle due to the variations in wave conditions.

Figure 4:
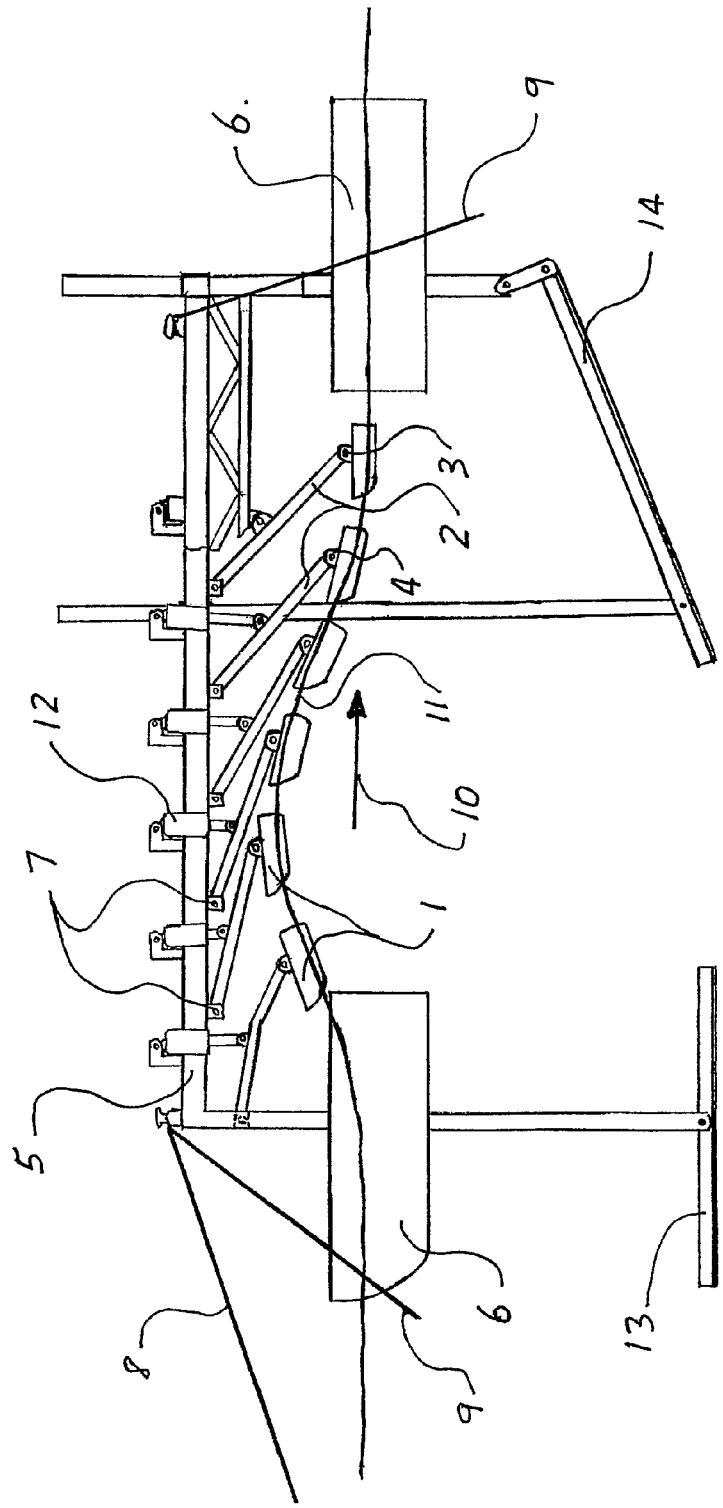
FIG. 4 is a partial cutaway side view of a floating version of an ocean wave energy converter that has yaw.

The side view of the ocean wave energy converter illustrated in FIG. 4, in addition to the array of floats and guidance arms previously described, has a structure 5 being rectangular and made of steel and supported above the water by a hull or pontoon 6 at each corner. The structure is secured by a permanent anchor and chain 8 attached to the structure 5 as a first mooring means at the centre of the front of the structure and the structure is also secured at the front and rear of each side by a respective side mooring chain 9 which extends to a mooring. The length of the side mooring chain is adjustable by an anchor winch that extends the length of one side while reducing the length of the chain on the other side so the ocean wave energy converter can yaw and always operates at the correct angle to the waves 11 which is with the elongated floats 1 parallel to the waves 11. The energy converter is shown with a wave 11 passing along it towards the rear as shown by the arrow 10.

The guidance arms 2 are of the trailing arm type of design and the pivot point 7 is at the forward end of the guidance arms 2 where they pivot from the structure 5 above and have limited pivotal movement along the horizontal axis parallel to the wave 11 front, with the pivot point 7 using bearings a housing and an axle. Two guidance arms are pivotally attached to each float 1 from above and the design of float and guidance arms allows for any floats to be removed from the water without interrupting the operation of adjacent floats. The guidance arms of the first float 1 to the left of the drawing, pivots from a lower point on the structure than the other guidance arms and the first guidance arm has a dog leg downwards approximately halfway along to improve movement of the float. The guidance arms of the first float are located in from the end of the float by about 10% of the length. The guidance arms of the second float are located off the end of the float with both first and second floats being the same length. With reference to the third float from the front and every float thereafter is five percent longer than each previous float and the guidance arms 2 are straight and pivot off the end of each float as shown in FIG. 3.

The guidance arm float brackets in combination with the guidance pin 3 and guidance arms allow the floats to have limited pivotal movement about the horizontal axis, and also allows for the guidance arms of each respective float to slide along the guidance pin for a limited distance of up to 10%. The length of the floats is 900% of the average width of each float and the average height of the floats is 40% of the average float width. The floats are rectangular in section at the rear and the lower front is like an eclipse with the average angle being about forty five degrees from the top of the float. At rest the elongated sides of the floats are located 50% of the width of a float apart. The ocean wave energy converter only extracts energy from the waves 11 as the floats are moving up a wave 11 front.

A fresh water based hydraulic system provides for the power transfer from the float and guidance arm combination to a common accumulator which then provides a steady consistent flow of water for a hydroelectric type water turbine and attached generator. A water based hydraulic ram 12 is pivotally attached to each guidance arm at one end about halfway along each guidance arm, and the hydraulic ram 12 is pivotally attached to the structure 5 at the other end.

As the floats move up over the wave 11, the attached guidance arm and hydraulic ram are forced upwards and pumps water out of the upper end of the cylinder of the hydraulic ram under a pressure sufficient to charge an accumulator which in turn supplies a consistent flow of water under pressure to drive the water turbine and attached generator. The hydraulic rams 12 are refilled with a fresh supply of water as the floats move down. The lower end of the cylinder of the hydraulic ram 12 is vented to atmosphere. A separate front resistant plate 13 and a rear underwater resistance plate 14 are located under the respective front and rear ends of the energy converter. The front resistance plate 13 is fixed horizontally and extends out either side of the energy converter and is not located under or in front of the array of floats 1, and is located about nine meters below the surface of the water. The rear resistance plate 14 is located directly under the rear section of the array of floats and adjustable up or down at the front and back whereby the angle from horizontal may be raised up at the rear of it to increase wave height when wave height is small, or to be horizontal when wave height is high.

The hulls 6 of the floats are elongate in form and are located at each corner of the structure. The front hulls 6 are substantially perpendicular to the long sides of the floats while the rear hulls 6 are each on an angle of 30° so they are spaced at a greater distance apart at the front than at the back and assist to direct waves into the most rear floats not shown. Some of the irrelevant features have been left from the drawings to reduce cluttering and to disclose the invention more clearly.

In an alternative preferred design which is not shown in the drawings, the ocean wave energy converter is a trimaran with three hulls the central hull being a much larger hull and taking the wave energy converter is secured for limited yaw about a large pylori fixed to the ocean floor about the front of the wave energy converter. A pylori substantially stabilises the front of the energy converter. The guidance arms are telescopic type arms that reciprocate up and down via a linear slide type design that is attached to the structure. The float guidance pin is not extended and the guidance arm pivot point does not provide for the guidance arm to slide back and forth along the float guidance pin. The guidance arm float brackets are fixed to the float about 20% of the length of the float in from the end of the floats. The guidance arms are angled back from vertical going up at an angle of 15° in the rear direction from vertical. Direct drive means is used to transfer energy from the guidance arm to the generator and this system uses a flexible cable that is attached to the top end of the guidance arm to then go about an idler pulley and then the flexible cable goes around a drive pulley to provide a one way mechanism on a shaft to turn a rotating output shaft which drives an electrical generator. Energy is extracted from the waves on only the up stroke of the floats. Only a rear resistance plate is used, this is adjustable in height and angle.

A further alternative design shares some similar features to that shown in FIG. 4 but the structure is permanently fixed to pylons located about the four corners of the structure. No hulls are used and the structure is raised up or down the pylons to the changing tide height by large hydraulic rams. The floats are substantially as shown in FIG. 4 except that both the upward and downward stroke of the float is used to generate useful power and this is achieved by the lower side of the hydraulic rams being used to pump water out under pressure as the floats move down and they refill with water as the float moves up. The guidance arms are also of the trailing arm type, however the guidance arms and the respective pivot points are located about 20% of the width of a float in from the end of the respective float, and the trailing arms are of the dog leg design shown on the forward most float in FIG. 4. Adjacent guidance arms are offset so the guidance arms allow uninterrupted movement of the floats. There are no resistance plates used on this version and the structure is stabilised by the pylons.

These different types of ocean wave energy converter and float operation guidance are shown to illustrate that this invention may be successfully operated in a number of different design variations, and that other changes and variations as would be apparent to one skilled in the art are deemed to fall within the scope and ambit of the invention as herein set forth and defined by the appended claims.

What is claimed is:

1. An ocean wave energy conversion apparatus including:
   a structure for positioning in a body of water, the structure being arranged so that at least a portion of the structure is above the body of water in use;
   a plurality of elongate floats being spaced apart to provide a gap therebetween in a first direction and having an average width also extending in the first direction, the first direction being substantially parallel to the direction of wave travel, the elongate floats extending in a second direction substantially perpendicular to the first direction, the gap between the elongate floats at rest being less than double the average width of the floats;
   a plurality of arm pairs, each arm pair including a pair of arms pivotally mounted to the structure to pivot about a respective arm pivot axis and to a respective float to pivot about a float pivot axis to thereby allow relative movement between the float and the structure, each arm pair having a spacing in the second direction, and wherein the spacing between each arm of each arm pair is different so that the arms of one arm pair cannot contact the arms of another arm pair in use;
   an energy converter for converting motion of the floats into electrical or other useful energy; and
   a drive connecting at least one of the arms of each elongate float to the energy converter and arranged such that at least upward motion thereof drives the energy converter.

2. The ocean wave energy conversion apparatus according to claim 1, wherein said arms have an arm length from the respective arm pivot axis to the respective float pivot axis, and the arm pivot axes are spaced apart in the first direction, and wherein spacing between adjacent arm pivot axes is less than the combined arm length and half the width of the attached floats.

3. The ocean wave energy conversion apparatus according to claim 1, wherein the structure may be positioned in a body of water such that the elongated floats are substantially parallel to waves moving across the body of water.

4. The ocean wave energy conversion apparatus according to claim 3, wherein each float has a front for facing a wave in use, and wherein the front of each float has a shape that is at least one of:
   angled;
   rounded; or,
   elliptical.

5. The ocean wave energy conversion apparatus according to claim 1, wherein the floats are adapted to at least partially submerge under a wave in use.

6. The ocean wave energy conversion apparatus according to claim 1, wherein each float has a buoyancy, and wherein the combined weight of a float and respective arm pair is between 5% and 50% of the buoyancy of the float.

7. The ocean wave energy conversion apparatus according to claim 1, wherein each float has a centre of buoyancy and a width in the first direction, and wherein the float pivot axis is positioned rearward of the centre of buoyancy between the centre of buoyancy and a point 15% of the width of the float away from the centre of buoyancy.

8. The ocean wave energy conversion apparatus according to claim 1, wherein the average height of each float is between 10% and 80% of the average width of the float, and the length of the float is more than 250% of the average width of the float.

9. The ocean wave energy conversion apparatus according to claim 1, and including:
   a frame;
   at least one hull attached to the frame, to support at least a portion of the structure above the body of water in use; and,
   at least one anchor line to at least partially restrain the position of the structure in at least one of the first direction and the second direction.

10. The ocean wave energy conversion apparatus according to claim 9, wherein the distance between the floats in the body first direction is less than 125% of the average width of the adjacent floats, the arm pivot axes of an adjacent arm pair are located closer together in the first direction than the length of the arms.

11. The ocean wave energy conversion apparatus according to claim 9, wherein the structure includes at least one stabilising plate attached to the structure at a position at least partially submerged in the body of water, the stabilising plate being adapted to at least partially stabilise rocking motion of the structure.

12. The ocean wave energy conversion apparatus according to claim 11, wherein the arms are trailing arms having forward end pivoting from the structure above, whereby the trailing arms comprising an arm pair of each later float, being a float which encounters a wave later than another float are offset to the outside of the arm pairs of the other float, being previous float, the arms of the arm pair of the previous float being closer together in the first direction and the previous float being shorter in length than the outside of the trailing arm pair so the arms and floats can be swung through an entire stroke while not interfering with the adjacent floats or trailing arms, the axis of the arm float pivot being located between about the average centre of buoyancy of the float and 15% behind the average centre of buoyancy of the float in the direction of wave travel.

13. The ocean wave energy conversion apparatus according to claim 12, wherein, for each float, the trailing arms and their respective pivot points are offset from the trailing arms and pivot points of an adjacent float, the relative width of the floats is between 25% and 90% of the length of the trailing arm, and the gap between the elongated sides of the floats is between 10% and 80% of the average width of the float.

14. The ocean wave energy conversion apparatus according to claim 13, wherein the relative width of the floats is between 30% and 80% of the length of the trailing arms, the floats are forced to become submerged into the wave and as the float moves up over the wave, the extent of the submergence when the average wave height is between two and three meters high is greater than the extent of the submergence when the average wave height is about half a meter.

15. A method of converting ocean wave energy including the steps of:
- positioning a structure in a body of water having waves which travel in a first direction so that at least a portion of the structure is above the body of water;
- pivotally mounting a plurality of arm pairs to the structure, each arm being so mounted at an arm pivot axis extending in a second direction substantially at right angles to the direction of wave travel;
- pivotally mounting a plurality of elongate floats extending in the second direction each to one of the arm pairs and each arm at a float pivot axis substantially parallel to the arm pivot axis to thereby allow relative movement between each float and the structure substantially in line with the first direction, the arms having a spacing in the second direction, and wherein the spacing for each arm pair is different so that the arms of one arm pair cannot contact the arms of another arm pair in use;
- the elongate floats having an average width and being spaced apart to provide a gap therebetween in the first direction and at rest being less than double the average width of the floats;
- providing an energy converter for converting motion of the floats into electrical or other useful energy; and
- connecting a drive between at least one of the arms of each elongate float and the energy converter such that at least upward motion thereof drives the energy converter.

16. The method according to claim 15, including partially submerging the elongate floats a wave.

17. The method according to claim 15, including restraining the position of the structure by connection to at least one anchor line.

18. The method according to claim 15 including stabilising rocking motion of the structure by attachment of at least one stabilising plate to the structure at a position at least partially submerged in the body of water.

* * * * *